United States Patent [19]

Gurbacki

[11] Patent Number: 5,129,678
[45] Date of Patent: Jul. 14, 1992

[54] DIRT AND GREASE PROTECTIVE COVER FOR THE REAR OF AN AUTOMOBILE

[76] Inventor: Theodore F. Gurbacki, 6111 Seascape Dr., San Diego, Calif. 92139-2228

[21] Appl. No.: 739,419

[22] Filed: Aug. 2, 1991

[51] Int. Cl.⁵ .............................................. B60R 27/00
[52] U.S. Cl. .................................. 280/770; 150/166
[58] Field of Search ................ 280/770, 762; 428/100, 428/102, 192, 198; 150/154, 166

[56] References Cited

U.S. PATENT DOCUMENTS 4,849,272  7/1989  Haney et al. ........................ 280/770

Primary Examiner—Andres Kashnikow
Assistant Examiner—Richard Camby
Attorney, Agent, or Firm—Charles C. Logan, II

[57] ABSTRACT

A dirt and grease protective cover for the outer rear panel of the trunk of an automobile and its rear bumper. The cover is formed of a flexible sheet of material having a plurality of first hook and loop fastener strips attached to its rear surface adjacent its top edge and a plurality of second hook and loop fastener strips attached to its rear surface adjacent its bottom edge. The flexible cover sheet is mounted in the trunk of a vehicle so that it may fold out and cover the rear of the automobile with the rear surface of the cover sheet and this rear surface would be folded against itself when in its retracted position in the trunk.

3 Claims, 1 Drawing Sheet

DIRT AND GREASE PROTECTIVE COVER FOR THE REAR OF AN AUTOMOBILE

BACKGROUND OF THE INVENTION

The invention relates to a cover and more specifically to a dirt and grease protective cover for the outer rear panel of the trunk of an automobile and its rear bumper.

Automobiles are notorious for collecting dirt, dust, and grease on the outer rear panel of the trunk of an automobile and also on the rear bumper. A person while placing or removing objects from the trunk area of the car quite often get their clothes dirty by coming into contact with the rear bumper or the outer rear panel of the trunk. Even when a person tries to be careful in loading or removing articles from the trunk it is almost impossible not to come into contact with the dirty automobile surface.

Presently there are no existing products on the market for solving the dilemma identified by the inventor. Several U.S. patents have been granted on inventions for removable covers that a mechanic would place on the fender of a vehicle to prevent it from being scratched or becoming greasy. None of these patents nor their structure has recognized the problem the inventor is trying to correct. The Haney et al U.S. Pat. No. 4,849,272 is directed to a magnetically securable fender cover apparatus. The Radke U.S. Pat. No. 4,884,824 is also directed to a magnetic fender cover. The Duke U.S. Pat. No. 4,896,911 is directed to an automobile side protector. The Falzone et al U.S. Pat. No. 4,997,227 is directed to a truck liner.

It is an object of the invention to provide a novel dirt and grease protective cover for the rear of an automobile that is retractable therein.

It is also an object of the invention to provide a novel dirt and grease protective cover for the rear of an automobile that can be easily installed by a do-it-yourselfer.

It is another object of the invention to provide a novel dirt and grease protective cover for the rear of an automobile that is economical to manufacture and market.

SUMMARY OF THE INVENTION

The novel dirt and grease protective cover for the rear of an automobile is formed from a flexible sheet of waterproof material. Preferably the sheet would be made of plastic material and it could be translucent.

The flexible sheet has a top edge whose thickness would be doubled over to provide extra strength for it. Its bottom edge would also be doubled over to form a loop within which an elongated stiffener rod could be inserted. The flexible sheet has a rear surface having a plurality of hook and loop fastener strips secured adjacent its top edge and its bottom edge.

The rear surface is the side of the cover that would come into contact with the outer rear panel of the trunk and the rear bumper. The top edge of the flexible sheet would be secured to the inner rear panel of the trunk by anchoring screws or some other fastening structure. The front surface of the flexible sheet is the side that would always come into contact with the person leaning over the trunk. When the flexible sheet is folded back upon itself into the trunk and the respective hook and loop fasteners from the top and bottom edges are secured to each other, the dirty rear surface of the flexible sheet would be folded so that its dirty surface would be in the interior of the fold and not come into contact with anything in the trunk.

DESCRIPTION OF THE PREFERRED EMBODIMENT

Figure 1:
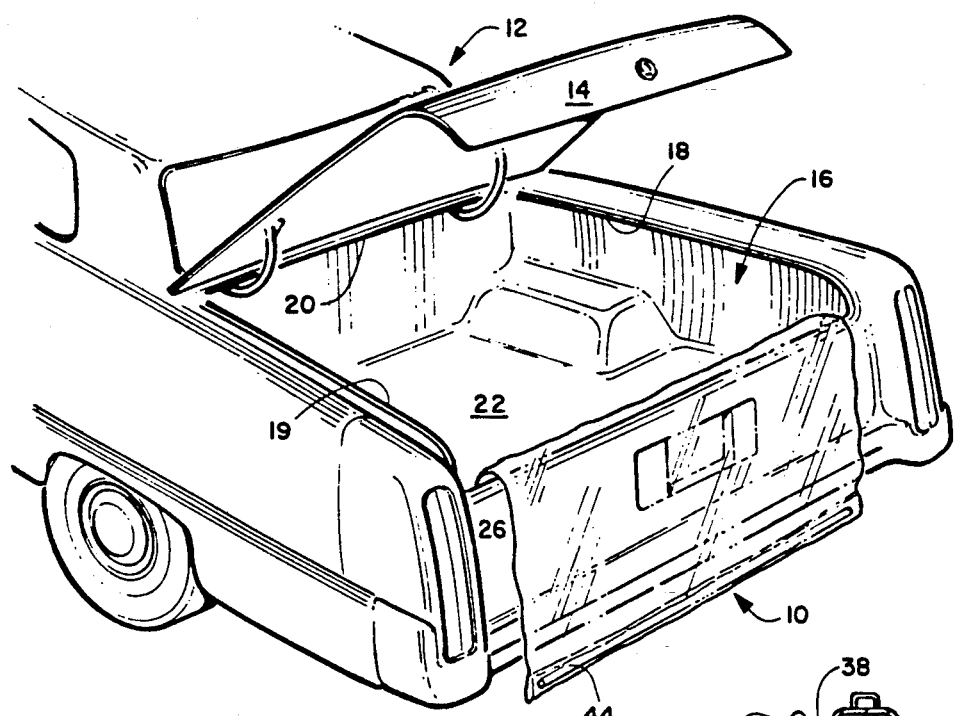
FIG. 1 is a rear perspective view of an automobile with its trunk open and the novel dirt and grease protective cover stretched down over the outer rear panel of the trunk and the rear bumper.
Figure 2:
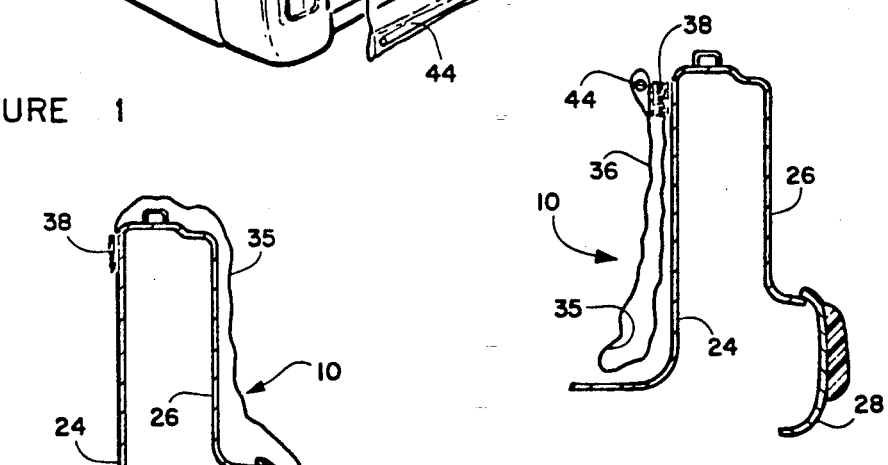
FIG. 2 is a schematic side elevation view showing the novel dirt and grease protective cover in its stored position.
Figure 3:
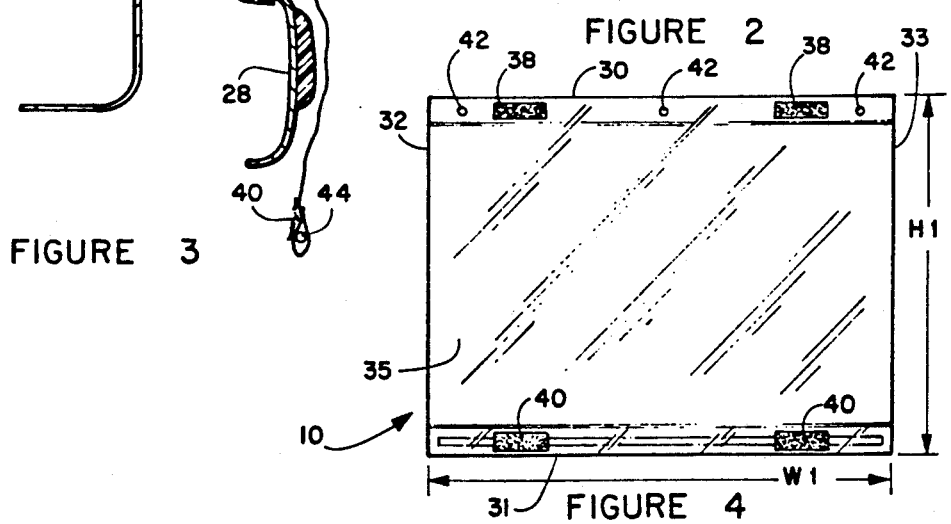
FIG. 3 is a schematic side elevation view showing the novel dirt and grease protective cover in the position similar to that of FIG. 1.
Figure 4:
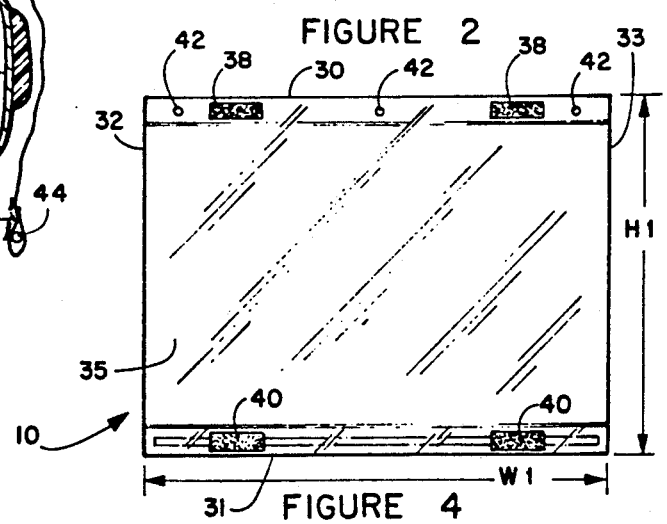
FIG. 4 is a front elevation view of the novel dirt and grease protective cover.

The invention will now be described by referring to FIGS. 1-4 of the drawing. The dirt and grease protective cover is generally designated numeral 10.

In FIG. 1 the dirt and grease protective cover 10 is seen in its deployed position. Automobile 12 has its trunk cover 14 open. The trunk 16 has laterally spaced inner edges 18 and 19, a front edge 20 a floor 22, and an inner rear panel 24. The outer surface of the car that gets dirty or greasy is outer rear panel 26 and rear bumper 29.

Dirt and grease protective cover 10 has a top edge 30, a bottom edge 31, a left edge 32 and a right edge 33. It has a rear surface 35 and a front surface 36. In the preferred embodiment, the cover sheet 10 has a doubled thickness at its top edge 30 and a doubled thickness at its bottom edge 31. Hook and loop fastener strips 38 are secured to the inner surface 35 adjacent the top edge of cover sheet 10. Hook and loop fastener strips 40 are secured to the rear surface 35 of cover sheet 10 adjacent its bottom edge. Anchor screws 42 are used to secure the top edge 30 of the cover sheet to the inner rear panel 24 of the trunk adjacent its top edge.

In the preferred embodiment cover sheet 10 has a width W1 that is approximately 38 inches long. Its height H1 is approximately 28 inches. A stiffener rod formed from wood or another type of material is captured in the loop formed at the bottom edge of cover sheet 10 and functions to weight the cover strip down and also keep it from flapping when the wind is blowing from the side.

What is claimed is:

1. A dirt and grease protective cover for the rear of an automobile comprising:

a flexible sheet of plastic material having a top edge, a bottom edge and laterally spaced side edges, said sheet having a front surface and a rear surface, said sheet having a predetermined width W1 and a predetermined height H1;

a plurality of first hook and loop fastener strips attached to the rear outer surface of said sheet adjacent its top edge;

a plurality of second hook and loop fastener strips attached to the rear outer surface of said sheet adjacent its bottom edge;

a bottom edge of said sheet is folded back on its self and secured thereto to form a closed loop that extends between said opposite lateral side edges, a stiffener rod is inserted in said closed loop to weight the bottom end of the cover down and also to keep from flapping when the wind is blowing from the side; and the top edge of said flexible sheet is anchored to the inner rear panel of the trunk of an automobile by a plurality of anchor screws.

2. A dirt and grease protective cover as recited in claim 1 wherein the top edge of said flexible sheet has a doubled over thickness to give it added strength.

3. A dirt and grease protective cover as cited in claim 1 wherein said flexible sheet is made of translucent material.

* * * * *